ized with a neutralizing agent having a monovalent group and at least
United States Patent Kostelnik et al.

Patent Number: 5,746,819
Date of Patent: May 5, 1998

[54] HIGH SOLIDS ANATASE TIO$_2$ SLURRIES

[75] Inventors: Robert J. Kostelnik, Ellicott City; Fu-Chu Wen, Severna Park, both of Md.

[73] Assignee: SCM Chemicals, Inc., Hunt Valley, Md.

[21] Appl. No.: 557,953

[22] Filed: Nov. 14, 1995

[51] Int. Cl.$^6$ ............................ C04B 14/30; C09C 1/36
[52] U.S. Cl. ............................ 106/447; 106/449
[58] Field of Search ........................ 106/447, 449

[56] References Cited

U.S. PATENT DOCUMENTS

| | | | |
|---|---|---|---|
| 4,146,516 | 3/1979 | Braun et al. | |
| 4,177,081 | 12/1979 | DeColibus | |
| 4,280,849 | 7/1981 | Howard et al. | 106/449 |
| 4,421,889 | 12/1983 | Braun et al. | |
| 4,868,228 | 9/1989 | Gonnet et al. | |
| 5,236,989 | 8/1993 | Brown et al. | 106/436 |
| 5,279,662 | 1/1994 | Smith | 106/447 |
| 5,432,238 | 7/1995 | Egraz et al. | 525/330.2 |
| 5,432,239 | 7/1995 | Egraz et al. | 525/330.2 |

FOREIGN PATENT DOCUMENTS

0193964  11/1994  Japan.

*Primary Examiner*—Mark L. Bell
*Assistant Examiner*—Louis M. Troilo
*Attorney, Agent, or Firm*—Kalow, Springut & Bressler

[57] ABSTRACT

The present invention discloses high solids slurries of sulfate process, anatase titanium dioxide pigment. The improvements of these slurries over those of the prior art are improved slurry stability, tolerance to calcium and magnesium ions, foaming tendencies and reduced tendency to flocculate. The slurries of the present invention are comprised of at least 65% by weight of anatase TiO$_2$ pigment produced by the sulfate production process dispersed in water containing a sufficient quantity of a dispersing agent selected from the group consisting of acrylic acid homopolymers and copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the above acids, which have been partially or completely neutralized with a neutralizing agent having a monovalent group and at least one neutralizing agent having a polyvalent group. A process for producing the slurries of the present invention is disclosed and comprises the steps of a) introducing the dispersing agent into water, b) adjusting the pH to a value greater than 7, c) adding the TiO$_2$, with adequate mixing to break up large agglomerates, and, optionally, d) grinding in the presence of a suitable grinding medium to achieve the desired mean particle size for pigmentary applications.

9 Claims, No Drawings

HIGH SOLIDS ANATASE TIO$_2$ SLURRIES

BACKGROUND OF THE INVENTION

Titanium dioxide is produced commercially in two crystalline polymorphic forms, namely the rutile form which can be produced by both the chloride and sulfate processes and the anatase form which is produced by the sulfate process. The teachings of this invention relate to the anatase form of TiO$_2$ which is produced by the sulfate process. Sulfate anatase TiO$_2$ is generally produced by hydrolyzing an aqueous solution of a titanium salt, such as the sulfate, and calcining the hydrolysate at 750–1000 ° C. The product resulting from the calcination contains a substantial amount of large particles and grit which must be broken up by either dry or wet grinding. The product also contains substantial amounts of impurities introduced during processing which have not been eliminated during the calcination process. These impurities, which are typically sulfates, phosphates and carbonates, limit the selection of dispersant which can be used for producing a fluid, high solids slurry for grinding and producing a stable, final TiO$_2$ pigment slurry. Experimentation has shown that the dispersant disclosures of the present invention relate primarily to the sulfate anatase TiO$_2$ and typically do not apply to rutile TiO$_2$ derived from the chloride process.

TiO$_2$, is the most optically efficient white pigment in commerce. For maximum efficiency in applications such as paper filling and coating, light scattering theory requires separation of individual pigment particles. In essentially all practical applications, the optical efficiency of TiO$_2$ is not realized due to flocculation of TiO$_2$ pigment particles. Slurries of pigments, such as TiO$_2$, can be stabilized through electrostatic and steric mechanisms. Prior art dispersants which act primarily through electrostatic effects include sodium tripolyphosphate and alkanolamines, such as methylisopropanol amine, 2-amino-2-methyl-1-propanol and triethanolamine. In addition to interaction with the pigment surface, the alkanol amines shift the slurry pH to a high value away from the pigments point of zero charge so that the pigment's charge density is maximized to promote pigment-pigment repulsion and relatively stable slurries. Steric repulsion is obtained when polymers, typically with a molecular weight between 2000 and 10,000, interact with the pigment surface and prohibit the pigments particles from approaching each other close enough so that they stick together. Slurries, which are an object of this invention, are comprised of charged polymers which provide slurry stabilization through both electrostatic and steric mechanisms, and have less tendency to flocculate than prior art TiO$_2$ slurries, thus, providing higher performance in their applications.

The present invention relates to high solids, low viscosity, anatase TiO$_2$ slurries which exhibit improved stability, calcium tolerance and reduced tendency to flocculate compared to prior art slurries. These improvements result from the incorporation of a dispersant comprising acrylic acid homopolymers or copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the above acids, which have been partially or completely neutralized with a neutralizing agent having a monovalent group and at least one neutralizing agent having a polyvalent group.

U.S. Pat. No. 3,772,046 teaches the use of alkanol amines in conjunction with a polyhydric alcohol, such as sorbitol, for producing high solids slurries of TiO$_2$ produced by both the sulfate and rutile processes. These slurries exhibit some improved viscosity stability and calcium tolerance, but not as much as can be achieved with the present invention.

U.S. Pat. No. 4,177,081 teaches high solids TiO$_2$ pigment slurries containing sodium polyacrylates and 2-amino-2-methyl-1-propanol and a method of producing said slurries. 2-amino-2-methyl-1-propanol is not used in the present invention. U.S. Pat. No. 4,448,609 teaches a process for producing hydrous oxide surface treated TiO$_2$ slurries using dispersants which are combinations of anionic and amine type dispersants. The anionic dispersants disclosed in this patent are, surprisingly, not effective for sulfate process anatase TiO$_2$.

U.S. Pat. No. 4,868,228 teaches a process for the grinding of coarse mineral materials comprising the steps of introducing a grinding agent selected from the group consisting of acrylic acid homopolymers and copolymers, which have been completely neutralized after polymerization by at least one neutralizing agent having a monovalent group and at least one neutralizing agent having a polyvalent group, into an aqueous suspension of the mineral materials, and grinding the minerals in the presence of the acrylic polymer or copolymer. This process is not workable for sulfate, process TiO$_2$. Solids contents of anatase TiO$_2$ above about 60% cannot be achieved unless the TiO$_2$ is added to a mixture of water and the dispersant.

U.S. Pat. No. 4,840,985 disclosed a process for grinding CaCO$_3$ using a grinding agent which is an acrylic acid homopolymer or copolymer with only 40–80% of the acid groups neutralized with agents which have combinations of monovalent and polyvalent cation groups. U.S. Pat. No. 5,181,662 teaches a process for grinding CaCO$_3$ at temperatures below 45° C. using a grinding agent which is an acrylic acid homopolymer or copolymer neutralized with agents which have combinations of monovalent and polyvalent cation groups. U.S. Pat. No. 5,317,053 teaches a method of preparing a high solids aqueous slurry of particulate CaCO$_3$ using a copolymer of acrylic acid and a sulfonated vinyl monomer. U.S. Pat. No. 5,432,238 and 5,432,239 claim agents and process for grinding and dispersing, said agents comprising polymers selected from acrylic polymers, vinyl polymers and vinyl copolymers, wherein said polymer contains acid sites partially or completely neutralized with Mg ions and Na ions.

SUMMARY OF THE INVENTION

One object of this invention is high solids slurries of sulfate process, anatase titanium dioxide pigment. The improvements of this slurry over those of the prior art are improved slurry stability, tolerance to calcium and magnesium ions, foaming tendencies and reduced tendency to flocculate. The slurries of the present invention are comprised of at least 65% by weight of anatase TiO$_2$ pigment produced by the sulfate production process dispersed in water containing a sufficient quantity of a dispersing agent selected from the group consisting of acrylic acid homopolymers and copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the above acids, which have been partially or completely neutralized with a neutralizing agent having a monovalent group and at least one neutralizing agent having a polyvalent group.

A second object of this invention is a process for producing high solids, sulfate process, anatase TiO$_2$ slurries. The process comprises the steps of a) introducing the dispersing agent into water, b) adjusting the pH to a value greater than 7, c) adding the TiO$_2$ with adequate mixing to break up large agglomerates, and, optionally, d)grinding in the presence of a suitable grinding medium to achieve the desired mean particle size for pigmentary applications.

A third object of the invention is an anatase slurry with lower Einlehner abrasion than prior art slurries.

DETAILED DESCRIPTION OF THE INVENTION

High solids slurries of TiO$_2$ of the prior art suffer from several shortcomings, most notably, poorer than desired calcium tolerance, viscosity stability, foaming tendencies and tendency to flocculate in their usage applications. The present invention improves upon these shortcomings for sulfate process, anatase TiO$_2$.

High solids slurries of sulfate process, anatase TiO$_2$ are provided with improved slurry viscosity stability, calcium and magnesium tolerance, foaming tendency and tendency to flocculate. The slurries are comprised of at least 65% by weight of anatase TiO$_2$ pigment produced by the sulfate production process dispersed in water containing a sufficient quantity of a dispersing agent selected from the group consisting of acrylic acid homopolymers and copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the above acids, which have been partially or completely neutralized with a neutralizing agent having a monovalent group and at least one neutralizing agent having a polyvalent group.

The acrylic acid homopolymer or copolymer useful in the practice of the present invention is produced by known processes of polymerization and has a molecular weight between 300 to 100,000, preferably between 1,000 to 20,000 and most preferably between 2,000 to 10,000.

The acid sites of the homopolymer or copolymer may be neutralized with combinations of neutralizing agents having monovalent or polyvalent groups. The neutralizing agent containing the monovalent group has a group selected from alkali metal cations, ammonium, aliphatic or cyclic primary, secondary or tertiary amines. The most preferred monovalent cations are sodium and potassium. The neutralizing agent containing the polyvalent group has a group selected from alkaline earth cations, zinc and aluminum. The most preferred polyvalent cation is calcium.

The degree of neutralization of the acid polymers by the neutralizing agents with monovalent cations is between 0.02 to 0.90, most preferably between 0.05 to 0.50. The degree of neutralization by the neutralization agents containing polyvalent cations is between 0.10 to 0.98, most preferably between 0.95 to 0.50.

The degree of neutralization can be achieved by neutralizing the acid polymer with a mixture of neutralizing agents containing monovalent and polyvalent cations or mixing the appropriate proportions of acid polymer neutralized with the monovalent cation containing neutralizing agents with the acid polymer neutralized with the polyvalent cation containing neutralizing agents.

Is The neutralized acid homopolymer or copolymer is contained in the slurry at an amount sufficient to achieve a fluid, stable viscosity slurry up to about 5 % based on the weight of the anatase TiO$_2$ present in the slurry. The preferred content of the neutralized acid homopolymer or copolymer is 0.05 to 1.0%, and the most preferred range is 0.10 to 0.60% based on the weight of the anatase TiO$_2$ present in the slurry.

The process for producing the high solids, TiO$_2$ slurry of the present invention comprises the steps of a) introducing the dispersing agent into water, b) adjusting the pH to a value greater than 7, c) adding the TiO$_2$ with adequate mixing to break up large agglomerates, and, optionally, d) grinding in the presence of a suitable grinding medium to achieve the desired mean particle size for pigmentary applications.

Tap water or deionized water can be used for the process of the invention. The pH of the dispersant/water mixture can vary from about 7 to about 12, preferably in the range of 8.5 to 11, and most preferably in the range of 9.0 to 10.0. The sulfate process anatase TiO$_2$ is preferably added with intense mixing, using any of a number of mixing devices familiar to those skilled in the art of pigment slurry production. A Cowles type blade on a mixer of suitable horsepower is one typical arrangement. The anatase TiO$_2$ which is added to the slurry can be calciner discharge product or it can be calciner discharge product which has been milled as a dry pigment using a fluid energy, hammer mill or other methods known to those skilled in the art of mineral pigment production.

The dispersed slurry can be optionally ground using vertical or horizontal milling technology which is used in the art of pigment production. In any event the particle size of the TiO$_2$ in the finished pigment slurry is between 0.10 to 0.80 microns, preferably between 0.15 to 0.60 microns and most preferably between 0.20 to 0.30 microns.

Anatase TiO$_2$ pigments are generally known to have lower abrasion than rutile TiO$_2$ pigments. The slurries of this invention surprisingly exhibit even lower Einlehner abrasion that slurries of pigments of the prior art.

The following comparative examples set forth preferred embodiments of the invention. These embodiments are merely illustrative and are not intended to, and should not be construed to, limit the claimed invention in any way.

COMPARATIVE EXAMPLE 1

512.1 grams of tap water and 6.08 grams of 1-amino-2-propanol, were mixed together in a 2500 ml plastic beaker for 3 minutes at 1500 rpm using a model 90 Premier Lab Dispersator equipped with a 2 inch Cowles blade. 1350 grams of a dry milled, anatase calciner discharge product were slowly added at 1500 rpm until wet out. The slurry was mixed at 2000 rpm for 5 minutes and sandmilled for 30 minutes at a sand to TiO$_2$ ratio of 1:1. The slurry was separated from the sand, and the TiO$_2$ content was adjusted to 72.5% with tap water. Slurry viscosity and aging characteristics are shown in Table 1.

COMPARATIVE EXAMPLE 2

The procedure of example 1 was employed with 5.78 grams of 2-amino-2-methyl-1-propanol used instead of the 1-amino-2-propanol. Slurry viscosity and aging characteristics are shown in Table 1.

COMPARATIVE EXAMPLE 3

512.1 grams of tap water, 3.38 g of a polyacrylic acid homopolymer having a molecular weight of about 5,800 and having acid groups neutralized with sodium hydroxide at a rate of 0.06, and 4.3 g of Ca(OH)$_2$ were mixed together in a 2500 ml plastic beaker for 3 minutes at 1500 rpm using a model 90 Premier Lab Dispersator equipped with a 2 inch Cowles blade. 1350 grams of a dry milled, anatase calciner discharge product were slowly added at 1500 rpm until wet out. The slurry was mixed at 2000 rpm for 5 minutes and sandmilled for 30 minutes at a sand to $TiO_2$ ratio of 1:1. The slurry was separated from the sand, and the $TiO_2$ content was adjusted to 72.5% with tap water. Slurry viscosity and aging characteristics are shown in Table 1.

Aliquots of the 72.5% $TiO_2$ content slurries prepared in Comparative Examples 1, 2, and 3 were stored undisturbed in 4 ounce plastic bottles at room temperature for up to 2 months to evaluate slurry stability. Brookfield viscosities, as a measure of slurry stability, were measured at various storage times. Brookfield viscosities were measured using a #3 spindle at 60 rpm with a Brookfield Model LVT viscometer. If the measurement was "off the scale," then the largest spindle at the highest rotational speed which keeps the needle "on scale" was used for the measurement. Two viscosity measurements were made. The first was made with minimal disturbance of the sample, and the second was made after shaking the stored sample vigorously for 30 seconds. Storage stability data is tabulated along with the initial viscosity data in Table 1.

Examination of the initial viscosity data of Table 1 shows that the viscosity of comparative example 3, which is the slurry composition of this invention, is surprisingly lower than that of the prior art slurries. As slurries of the prior art settle and thicken with time, the slurry of this invention retains comparatively good fluidity.

TABLE 2

Brookfield Viscosities[1] of 70% $TiO_2$ Slurries Treated with Calcium Carbonate

| Dispersant | 1% $CaCO_3$ | | | 5% $CaCO_3$ | | |
| --- | --- | --- | --- | --- | --- | --- |
| | $T_0$ | 1 Day | 1 Week | $T_0$ | 1 Day | 1 Week |
| Comparative Example 4 | 760 | 10,000 | 15,200 | TTTM[2] | TTTM | TTTM |
| Comparative Example 5 | 1,420 | 5,260 | 8,700 | TTTM | TTTM | TTTM |
| Comparative Example 6 | 220 | 250 | 420 | 250 | 260 | 270 |

[1]Measured at 60 rpm, #3 spindle.
[2]TTTM: Too Thick to Measure.

Examination of the data in Table 2 shows that the slurry of this invention, example 6, exhibits dramatically improved resistance to thickening in the presence of calcium carbonate. While the slurries of the prior art when mixed with 5% calcium carbonate were too thick to measure within 5 minutes of preparation, that of the present invention remained fluid for over 1 week even in the presence of 5 % calcium carbonate.

Comparative examples 7 and 8 illustrate the improved resistance to flocculation provided by the slurries of this invention compared to prior art slurries.

TABLE 1

Initial and Aged Brookfield Viscosity Data (Centipoise) of 72.5% $TiO_2$ Slurries

| | INITIAL | 1 DAY[1] | 1 WEEK | 2 WEEKS | 1 MONTH | 2 MONTHS |
| --- | --- | --- | --- | --- | --- | --- |
| COMPARATIVE EXAMPLE 1 | 1130 | 1070/1150 | 700/1190 | 1300/1250 | 1750/1270 | 3700/1300 |
| COMPARATIVE EXAMPLE 2 | 1150 | 1100/1230 | 980/1260 | 1080/1380 | 1730/1350 | 4400/1650 |
| COMPARATIVE EXAMPLE 3 | 290 | 290/290 | 360/290 | 410/300 | 700/310 | 3770/290 |

[1]Number before "/" is viscosity of undisturbed sample, and that after the "/" is viscosity of shaken sample.

The following 3 examples illustrate the improved resistance to thickening of the slurries of this invention when mixed with calcium carbonate. The calcium tolerance procedure consists of adding 1 % and 5 % (based on the $TiO_2$ weight) of calcium carbonate to 300 g of a 70% aqueous slurry of $TiO_2$, in a 250 ml Nalgene beaker. The slurry with added calcium carbonate was mixed for 3 minutes at 2500 rpm using a model 90 Premier Lab Dispersator equipped with a 1" Cowles blade. The Brookfield viscosity was measured at 5 minutes, 1 day and 1 week after addition of the calcium carbonate.

COMPARATIVE EXAMPLE 4

The slurry of example 1 was diluted to 70.0% $TiO_2$ and treated with calcium carbonate according to the above procedure. Viscosity stability data is presented in Table 2.

COMPARATIVE EXAMPLE 5

The slurry of example 2 was diluted to 70.0% $TiO_2$ and treated with calcium carbonate according to the above procedure. Viscosity stability data is presented in Table 2.

COMPARATIVE EXAMPLE 6

The slurry of example 3 was diluted to 70.0% $TiO_2$ and treated with calcium carbonate according to the above procedure. Viscosity stability 5 data is presented in Table 2.

COMPARATIVE EXAMPLE 7

A sulfate process, anatase $TiO_2$ slurry was prepared according to the method of comparative example 1 except that anatase calciner discharge product was used rather than dry milled, anatase calciner discharge product. The slurry, dispersed with 1-amino-2-propanol, was diluted with deionized water, tap water (hardness at about 90 ppm $CaCO_3$) and tap water containing a cationic starch commonly used in the wet end of the paper making process. Two $TiO_2$: starch ratios, 1:1 and 1:2, were tested. The final dispersion contained about $5 \times 10^9$ gram $TiO_2$ per ml. This $TiO_2$ concentration is at the order of magnitude typically found in the paper making process. The mean sizes of the $TiO_2$ pigment in the presence of the various potential flocculants is shown in Table 3. Mean sizes were determined by a proprietary particle size measurement which relates turbidity to the particle size of $TiO_2$.

COMPARATIVE EXAMPLE 8

A sulfate process, anatase $TiO_2$ slurry was prepared according to the method of comparative example 3 except that anatase calciner discharge product was used rather than dry milled, anatase calciner discharge product. The slurry, which is an object of this invention, was diluted and tested in accordance with comparative example 7. The mean sizes of the pigment in the presence of the various potential flocculants are shown in Table 3.

TABLE 3

Particle Sizes of TiO₂ Pigments in the Presence of Various Flocculants

| Dilution Condition | Example 7 Mean Size (μm) | Example 8 Mean Size (μm) |
|---|---|---|
| In deionized water | 0.33 | 0.28 |
| In tap water | 0.79 | 0.32 |
| In tap water with TiO₂/starch = 1/1 | 0.59 | 0.38 |
| In tap water with TiO₂/starch = 1/2 | 0.68 | 0.40 |

The data in Table 3 shows that the slurry of the present invention, example 8, retains a significantly smaller particle size than prior art slurries when exposed to potential flocculants, and, hence, a greater resistance to flocculation. The slurries of the present invention would provide greater opacity and brightness in paper applications owing to a smaller effective particle size which approaches the theoretical optimum.

Comparative examples 9, 10 and 11 demonstrate the lower Einlehner abrasion of slurries prepared according to this invention compared to prior art slurries. Lower abrasion is desirable, because less abrasive materials result in longer paper machine wire life and reduced wear on cutting knives. In the Einlehner abrasion test, the weight loss of a wire disc which is contacted by a rotary abrader and the test slurry is used as a relative measure of the abrasiveness of the test material. In our testing we used a test material solids level of 20% and 87,000 revolutions of the rotary abrader.

COMPARATIVE EXAMPLE 9

495.9 grams of tap water and 3.4 grams of 1-amino-2-propanol, were mixed together in a 2500 ml plastic beaker for 3 minutes at 1500 rpm using a model 90 Premier Lab Dispersator equipped with a 2 inch Cowles blade. 1350 grams of sulfate process, anatase calciner discharge product were slowly added at 1500 rpm until wet out. The slurry was mixed at 2100 rpm for 15 minutes and sandmilled for 30 minutes at a sand to TiO₂ ratio of 1:1. The slurry was separated from the sand, and the TiO₂ content was adjusted to 20% with tap water for abrasion testing. Abrasion test results are listed in Table 4.

COMPARATIVE EXAMPLE 10

The slurry preparation procedure of example 9 was employed except that 3.4 g of 2-amino-2-methyl-1-propanol were used in place of 1-amino-2-propanol. Abrasion test results are listed in Table 4.

COMPARATIVE EXAMPLE 11

The slurry preparation procedure of example 9 was employed except that 3.4 g of a polyacrylic acid homopolymer having a molecular weight of about 5,800 and having acid groups neutralized with sodium hydroxide at a rate of 0.06, and 4.9 g of Ca(OH)₂ were used in place of 1-amino-2-propanol. Abrasion test results are listed in Table 4.

TABLE 4

Einlehner Abrasion of 20% TiO₂ Slurries

| | Weight Loss (mg) |
|---|---|
| Comparative Example 9 | 19 |
| Comparative Example 10 | 16 |
| Comparative Example 11 | 11 |

The data in Table 4 shows that the slurries of this invention, example 11, have dramatically unexpected lower abrasion than prior art slurries.

Upon reading the subject application, various alternative constructions and embodiments will become obvious to those skilled in the art. These variations are to be considered within the scope and spirit of the subject invention. The subject invention is only to be limited by the claims which follow and their equivalents.

What is claimed is:

1. A high solids slurry of anatase $TiO_2$ pigment which comprises at least 65% by weight of anatase $TiO_2$ pigment dispersed in water containing a dispersing agent selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group.

2. The slurry of claim 1 wherein said dispersing agent comprises an acrylic acid homopolymer.

3. The slurry of claim 1 wherein said neutralizing agent having a monovalent group is an alkali metal cation and said neutralizing agent having a polyvalent group is calcium cation.

4. The slurry of claim 1 which has a lower Einlehner abrasion value than a comparable slurry comprising an alkanolamine dispersion agent.

5. The slurry of claim 1 wherein said pigment is produced by a sulfate production process.

6. The slurry of claim 5 wherein said pigment contains impurities comprising sulfates.

7. A process for preparing a high solids slurry of anatase $TiO_2$ pigment which comprises at least 65% by weight of anatase $TiO_2$ pigment dispersed in water containing a dispersing agent selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group, comprising steps of:

a) introducing said dispersing agent into water, b) adjusting the pH to a value greater than 7, and c) adding said TiO$_2$ with adequate mixing to break up large agglomerates.

8. A high solids slurry of anatase TiO$_2$ pigment which comprises at least 65% by weight of anatase TiO$_2$ pigment produced by a sulfate production process dispersed in water containing a dispersing agent comprising an acrylic acid homopolymer which has been at least partially neutralized with a monovalent neutralizing agent comprising an alkali metal cation and polyvalent neutralizing agent comprising calcium cations.

9. The process of claim 7 further comprising the step of:

d) grinding the dispersed TiO$_2$ in the presence of a grinding medium to achieve a particle size for pigmentary applications.

* * * * *

UNITED STATES PATENT AND TRADEMARK OFFICE
CERTIFICATE OF CORRECTION

PATENT NO. : 5,746,819
DATED : May 5, 1998
INVENTOR(S) : Robert J. Kostelnik and Fu-Chu Wen It is certified that error appears in the above-indentified patent and that said Letters Patent is hereby corrected as shown below:

Column 6, line 52, change "$5x10^9$" to -- $5x10^{-4}$ --;

Column 1, line 26, change "$TiO_2$." to -- $TiO_2$; --;

Column 1, line 45, change "pigments" to -- pigment --;

Column 2, line 24, change "sulfate.process" to -- sulfate process --;

Column 2, line 40, change "No." to -- Nos. --;

Column 3, line 63, change "Is The" to -- The --;

Column 5, line 67, change "stability 5" to -- stability --; and

Signed and Sealed this

Thirteenth Day of October 1998

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,746,819
DATED : May 5, 1998
INVENTOR(S) : Robert J. Kostelnik and Fu-Chu Wen Page 1 of 1

It is certified that error appears in the above-identified patent and that said Letters Patent is hereby corrected as shown below:

Column 1,
Line 40, replace "pigments" with -- pigment's --.

Column 7,
Line 13, replace "shows" with -- show --.

Signed and Sealed this

Thirty-first Day of July, 2001

Attest:

Nicholas P. Godici

NICHOLAS P. GODICI
Attesting Officer
Acting Director of the United States Patent and Trademark Office